Figure 1:
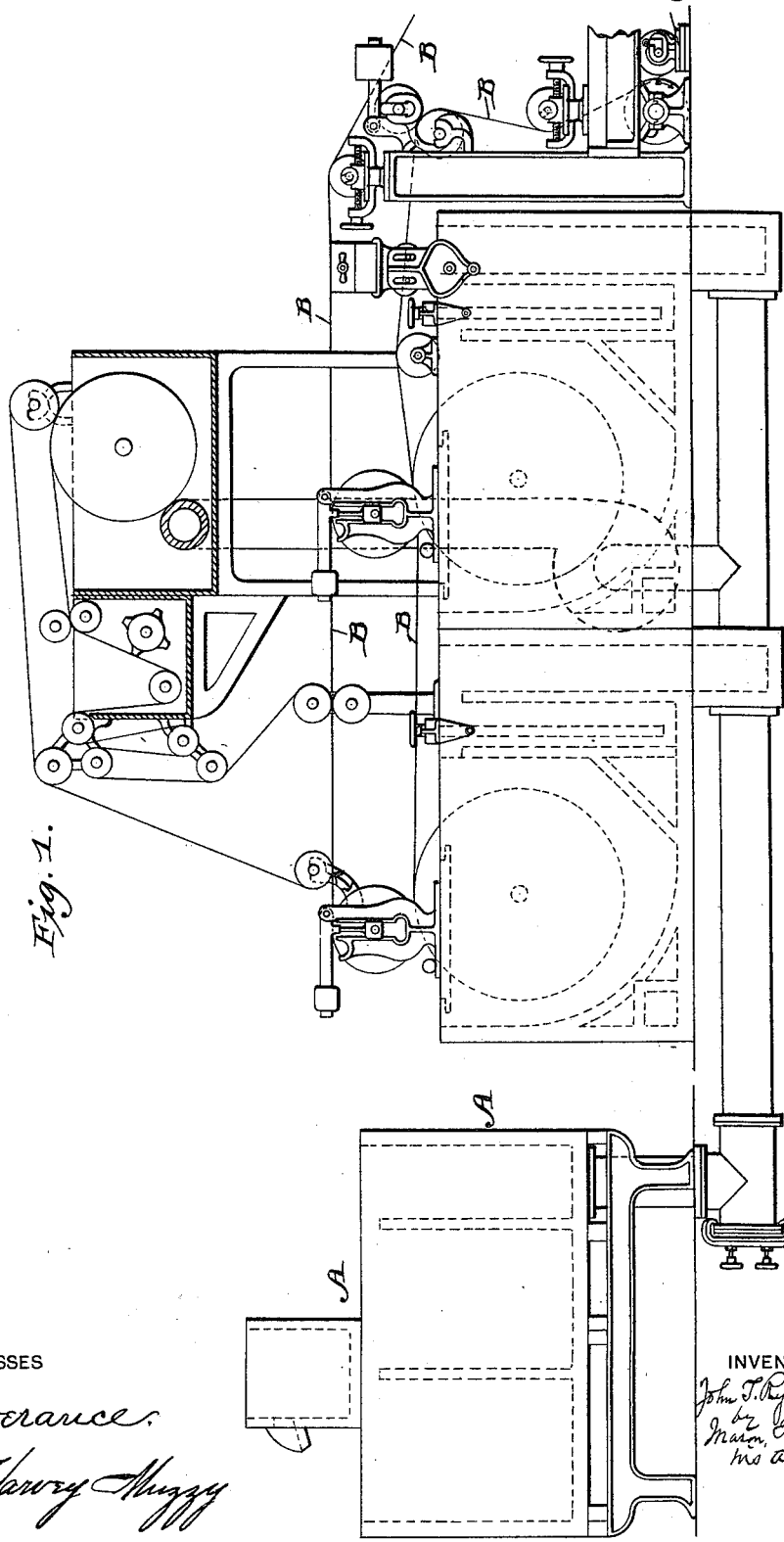

(No Model.) 5 Sheets—Sheet 1.
J. T. RYAN.
MACHINE FOR MANUFACTURING PAPER INTERLINING FOR DRESSES.
No. 566,278. Patented Aug. 18, 1896.

WITNESSES
INVENTOR (No Model.) 5 Sheets—Sheet 2.
J. T. RYAN.
MACHINE FOR MANUFACTURING PAPER INTERLINING FOR DRESSES.
No. 566,278. Patented Aug. 18, 1896.
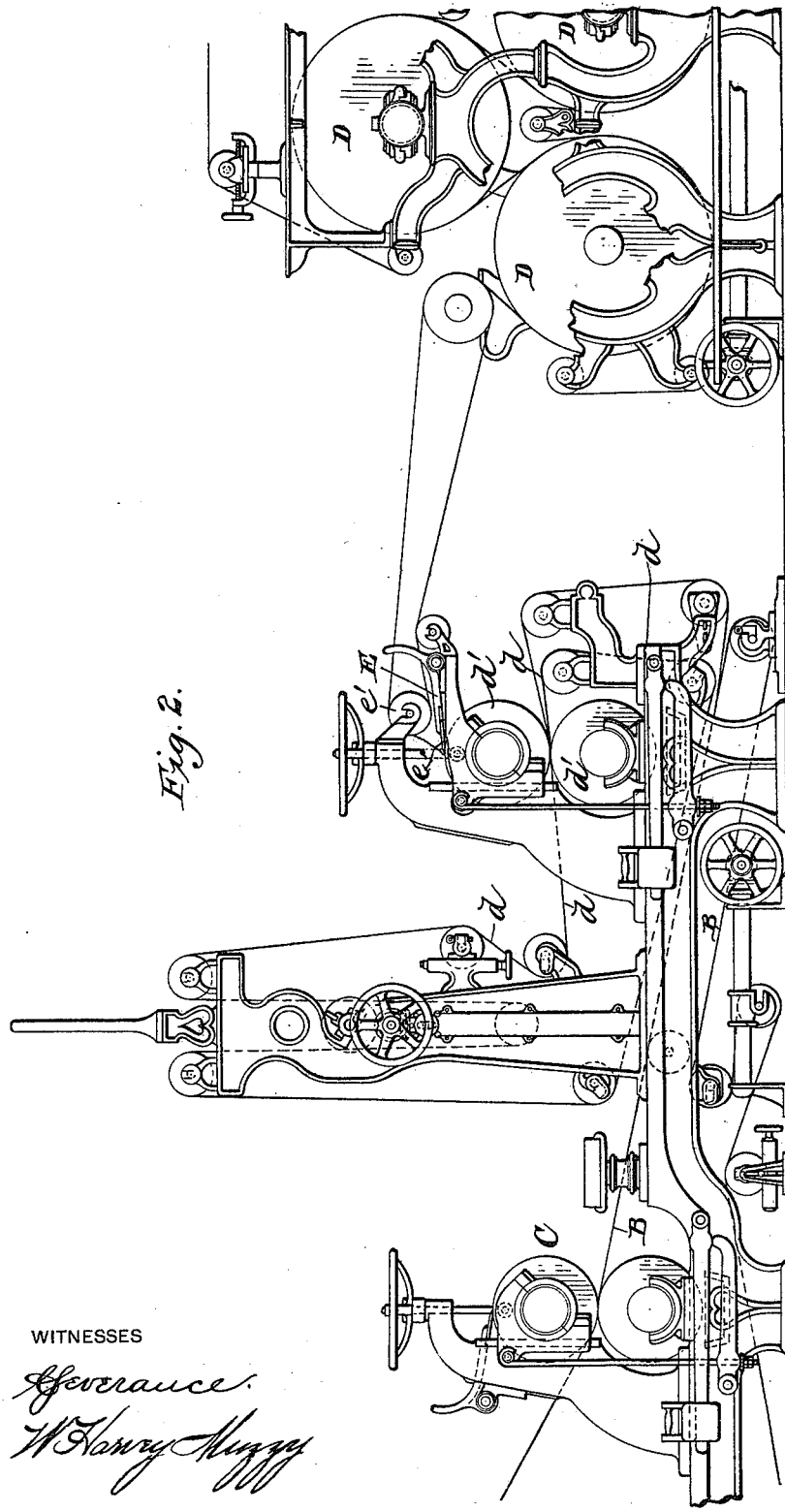

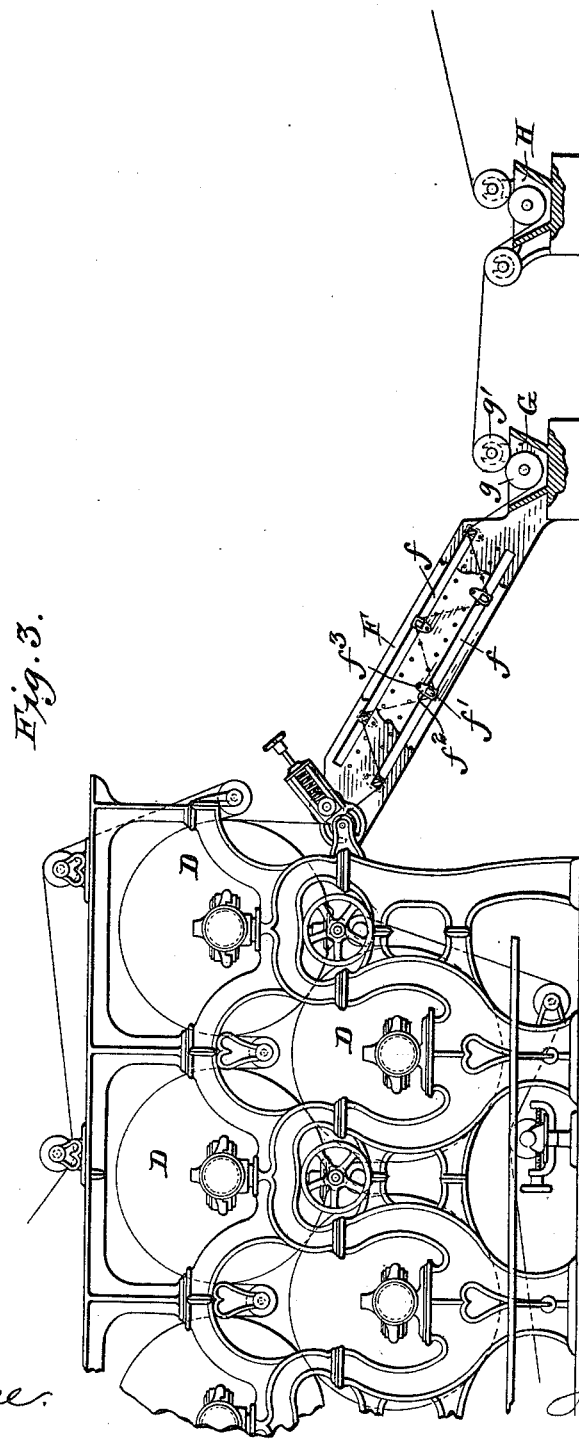

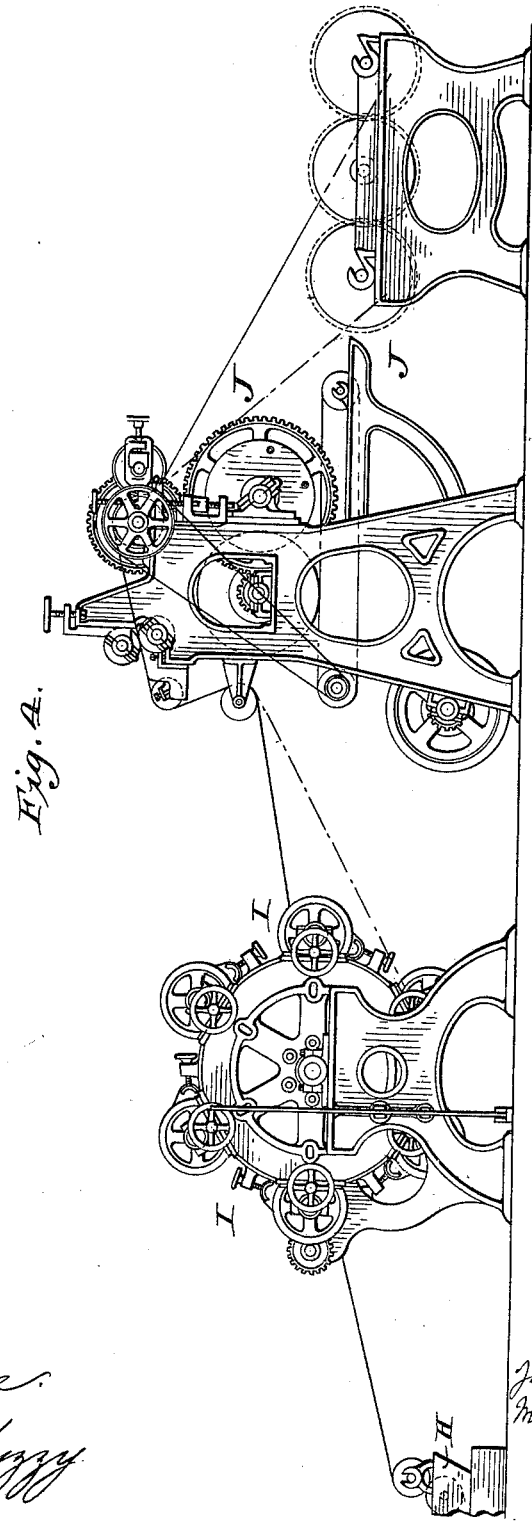

(No Model.) 5 Sheets—Sheet 5.
J. T. RYAN.
MACHINE FOR MANUFACTURING PAPER INTERLINING FOR DRESSES.
No. 566,278. Patented Aug. 18, 1896.
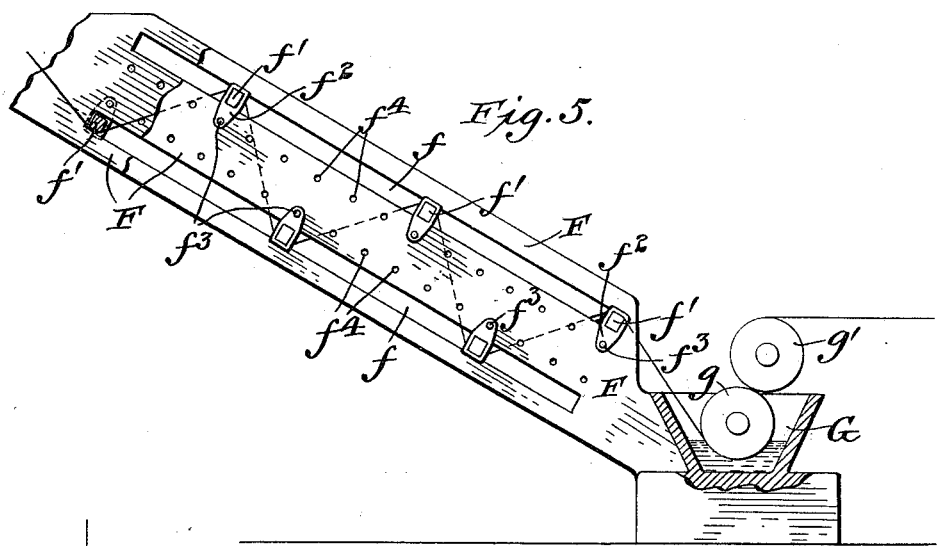
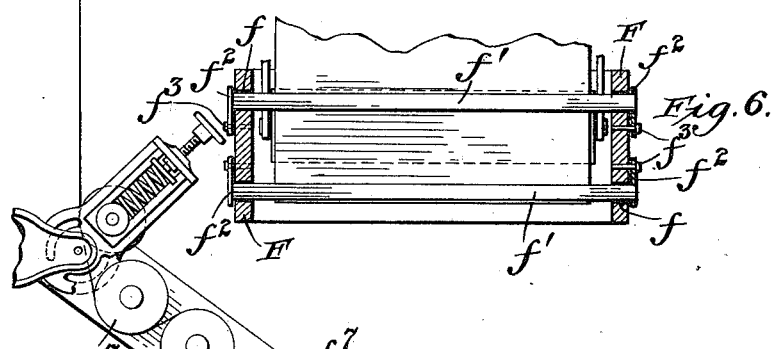
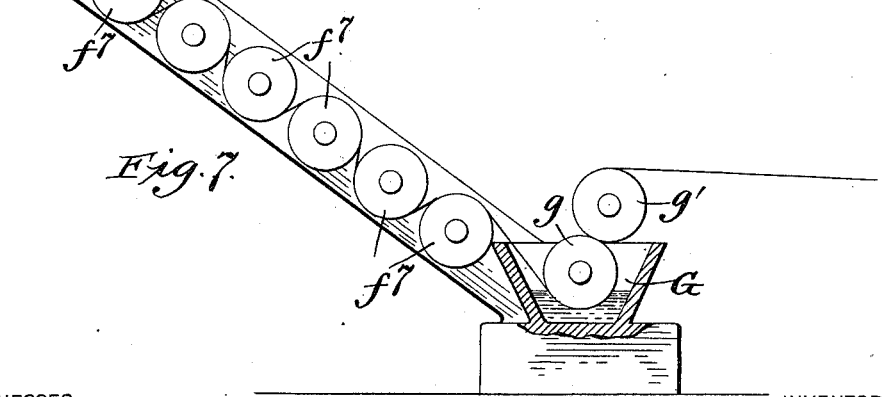

UNITED STATES PATENT OFFICE.

JOHN TYLER RYAN, OF LOCKPORT, NEW YORK.

MACHINE FOR MANUFACTURING PAPER INTERLINING FOR DRESSES.

SPECIFICATION forming part of Letters Patent No. 566,278, dated August 18, 1896.

Application filed October 3, 1895. Serial No. 564,540. (No model.)

*To all whom it may concern:*

Be it known that I, JOHN TYLER RYAN, a citizen of the United States, residing at Lockport, in the county of Niagara and State of New York, have invented certain new and useful Improvements in Machines for Manufacturing Paper Interlining for Dresses; and I do hereby declare the following to be a full, clear, and exact description of the invention, such as will enable others skilled in the art to which it appertains to make and use the same.

My invention relates to improvements in machines for manufacturing paper for dress-interlinings; and it consists of certain novel constructions, combinations, and arrangements of parts, as will be hereinafter described and claimed.

In the accompanying drawings, forming part of this specification, Figures 1, 2, 3, and 4 represent side elevations of the different portions of a paper-machine to which my invention is applied. Fig. 5 represents a side elevation, partly in section and partly broken away, of my stretching or softening device. Fig. 6 represents a transverse vertical section through the same; and Fig. 7 represents a side elevation, partly broken away, of another form of my stretching or tension device.

A in the drawings represents the agitating-box for the paper-pulp, which supplies the pulp to the upper and lower vats, in which latter the making-cylinders and couching-rolls operate as usual; B, the endless felt; C, the wet press-rolls; $d$, the dry felt for carrying the web from the same to the dry press-rolls $d'$, and D the hot drying-cylinders about which the web passes. All the aforegoing parts are old in the art and need not therefore be further described.

A doctor E is pivoted in proximity to the top press-roll $d'$ and is provided with a blunt obstructing-blade $e$, which engages said roll $d'$. Before reaching the rollers $d'$ the paper undergoes the usual process of manufacture. The wet web of paper passing over said roll $d'$ comes in contact with said obstructing-blade and is crowded up and over the same, thus imparting to said web transverse ridges or undulations in an irregular manner. After leaving the doctor the web passes loosely over a supporting-roller $e'$ and thence to the drying-cylinders D, about which it passes. These cylinders are run at less speed than the rollers $d'$, so that the paper will not be pulled forward and stretched at this stage, and thus prematurely have removed from it the wrinkled surface imparted by the doctor, before the paper has been sufficiently dried to remain in said wrinkled condition under strain. After the paper leaves the drying-cylinders it passes into the stretching or softening device. This device comprises two spaced and inclined side frames F, each provided with a pair of longitudinal slots $f\,f$. Transverse bars $f'\,f'$ have their ends mounted in these slots, and are secured in any desired adjusted position by end plates $f^2\,f^2$, with which they are provided. Each of these plates is apertured to permit the passage of a securing-pin $f^3$. These pins are adapted to engage apertures $f^4$ in the sides of the frames F and thus hold said bars in any desired adjusted position. The bars are so arranged that the web will pass in a zigzag course from one to the other and will thus be stretched and have its fiber broken or bent, thereby causing said wrinkles to be less definite and sharp and the paper to be soft and pliable. The stretching and softening effect of the device is increased or decreased by moving the bars toward or away from each other. The greater the angle the web turns the greater the effect, and vice versa. These bars obviously may be substituted by rollers. The stretching of the web softens the paper and renders it pliable in the same manner that pounding would, but of course with much less expenditure of time and labor and with greater uniformity. The web passes from the last of the bars into a tank G and about rollers $g\,g'$, mounted therein, and is thus caused to be thoroughly saturated with a chemical solution in said tank. This solution is preferably of such a character as to make the paper soft and pliable after passing therethrough. The web passes from the tank G to a similar tank H, where the bath is repeated.

In Fig. 7 I have shown another form of my stretching or softening device, in which I employ rollers $f^7\,f^7$, journaled in the side frames F. The rollers normally revolve, but can be locked either singly or collectively against such revolution by friction devices locked by weights or by ratchet wheels and pawls, thus increasing the strain and consequently the stretching of the web.

As many bars or rollers may be placed in the frame as the stretching may require. By increasing or decreasing the number of bars or rollers, and thus lessening or increasing the distance between them, acute or obtuse angles will be made, and consequently the effect will be increased or decreased, as the case may be, and the fibers of the paper broken or bent more or less.

The object of the stretchers is not to entirely eliminate the wrinkles imparted to the paper at the doctor, but to make said wrinkles less pronounced or sharp in outline and at the same time soften the paper in the desired degree. After leaving the tank H the web passes through rolls I, which are speeded sufficiently fast to stretch the paper, these latter rollers having the same effect on the wrinkled paper as pounding would have on a plain sheet, softening the sheets at little cost and with great regularity. The paper, after passing through the before-mentioned devices, is wound on suitable reels J and is ready to be shipped.

The paper manufactured by my process is intended principally for use as dress-interlining and has all the requisites of a perfect paper for such purpose, and it fully subserves the principal object of fulling the dress and at the same time is soft and pliable and has not the disagreeable rustling sound, which is the main defect with most papers not so treated.

I prefer to use the following formula for the softening-bath mentioned in the aforegoing description: sal-ammoniac, caustic soda, gum-tragacanth, and borax. These ingredients are dissolved in distilled water and thoroughly commingled and mixed together.

Having now described my invention, what I claim as new, and desire to secure by Letters Patent, is—

1. In a machine for making crinkled-paper interlining for dresses, the combination with the parts of a paper-making machine by which pulp is formed into a crinkled sheet and the crinkles dried and set, of a supporting-frame located forward of the drying and setting means consisting of side plates provided with longitudinal slots, cross-bars connecting the side plates, and arranged in a zigzag manner relatively to each other and adjustably mounted in said slots, and means for securing the bars in any desired adjusted position, substantially as described.

2. In a machine for making crinkled-paper interlining for dresses, the combination with the parts of a paper-making machine by which pulp is formed into a crinkled sheet of paper and the crinkles dried and set, of a frame located forward of the drying and setting means consisting of side plates and a series of cross-bars or rollers through which the crinkled paper is designed to pass in a zigzag manner and thereby to be stretched and softened, substantially as described.

3. In a machine for making crinkled-paper interlining for dresses, the combination with the parts of a paper-making machine by which pulp is formed into a crinkled sheet of paper and the crinkles dried and set, of a frame located forward of the drying and setting means, consisting of side plates and a series of cross-bars arranged therein in a zigzag relatively to each other through which the crinkled paper is designed to pass in a zigzag manner and thereby to be stretched and softened, and a vat adapted to contain a softening solution through which the crinkled and partially softened and stretched paper is designed to pass and thereby be further softened, substantially as described.

In testimony whereof I hereunto affix my signature in presence of two witnesses.

JOHN TYLER RYAN.

Witnesses:
WALTER H. HOWES,
S. C. LEWIS.